United States Patent
Wang

(10) Patent No.: US 7,134,039 B2
(45) Date of Patent: Nov. 7, 2006

(54) RECOVERY OF REAL-TIME VIDEO DATA AFTER POWER LOSS

(75) Inventor: Samuel C. Wang, Milpitas, CA (US)

(73) Assignee: Magnum Semiconductor, Inc., Fremont, CA (US)

( * ) Notice: Subject to any disclaimer, the term of this patent is extended or adjusted under 35 U.S.C. 154(b) by 158 days.

(21) Appl. No.: 10/894,340

(22) Filed: Jul. 20, 2004

(65) Prior Publication Data

US 2006/0008250 A1   Jan. 12, 2006

Related U.S. Application Data

(60) Provisional application No. 60/585,072, filed on Jul. 6, 2004.

(51) Int. Cl.
  *G06F 11/00*   (2006.01)
  *H04N 5/91*    (2006.01)
  *H04N 5/85*    (2006.01)

(52) U.S. Cl. ............... 714/2; 386/46; 386/125

(58) Field of Classification Search ........... 714/6, 714/20, 24, 42; 386/46, 95, 111; 369/47
  See application file for complete search history.

(56) References Cited

U.S. PATENT DOCUMENTS

| | | | |
|---|---|---|---|
| 5,917,914 A | 6/1999 | Shaw et al. ............... 380/42 |
| 5,991,911 A | 11/1999 | Zook ............... 714/758 |
| 7,017,078 B1* | 3/2006 | Frimout ............... 714/20 |
| 2002/0025138 A1* | 2/2002 | Isobe et al. ............... 386/95 |
| 2004/0078610 A1* | 4/2004 | Naitoh ............... 713/300 |
| 2004/0136693 A1* | 7/2004 | Iwasaki et al. ............... 386/95 |

* cited by examiner

*Primary Examiner*—Thai Tran
*Assistant Examiner*—Mishawn Dunn
(74) *Attorney, Agent, or Firm*—Robert P. Bell

(57) ABSTRACT

A number of different subroutines or algorithms are provided for locating lost video data, reconstructing navigation data, and creating new navigation files or the like so that the DVD may be made readable by an ordinary DVD player. The present invention provides algorithms to recover video data for each of a number of different DVD formats, so that video data may be recovered regardless of which format DVD was being used at the time (e.g., DVD+RW, DVD+R, DVD-RW, DVD-R, or the like). In addition, the present invention provides a number of other algorithms that be used by one or more of the different recovery algorithms, to recover various aspects of data from a disc. The combination of these algorithms provides a complete package of data recovery techniques that allows for video data to be recovered in the event of a power loss or other interruption, and in most instances, creates recordable DVD which may be subsequently read by other DVD players and the like.

18 Claims, 17 Drawing Sheets

RECOVERY OF REAL-TIME VIDEO DATA AFTER POWER LOSS

CROSS-REFERENCE TO RELATED APPLICATIONS

The present application claims priority from Provisional U.S. Patent Application No. 60/585,072, filed on Jul. 6, 2004, which is incorporated herein by reference.

FIELD OF THE INVENTION

The present invention relates to system software/firmware for a DVD recorder. In particular, the present invention is directed toward a method and apparatus for preventing data from being lost in the event a DVD recording session is interrupted, for example, by a power failure.

BACKGROUND OF THE INVENTION

Recordable DVDs are becoming a popular format for storing video and other types of data. These recordable DVDs may be provided in one or more types, including recordable DVDs (DVD/R) and rewritable DVDs (DVD/RW). The former may generally be recorded only once, while the latter may be re-written a number of times. Each of these two types may be provided in one or more formats, including +VR formats (e.g., DVD+R and DVD+RW), as well as −VR formats (e.g., DVD-R and DVD-RW), as well as other customer formats such as DVD Video. The challenge for manufacturers of DVD playback and recording equipment is to provide systems working with all formats in a manner seamless and transparent to the consumer.

The +VR formats were developed by Philips Electronics (Koninklijke Philips Electronics N.V), and have many features analogous to the preceding generation of non-recordable DVDs. Data may be recorded as a stream of MPEG encoded video in successive blocks on the DVD, preceded with a header file of navigation information. For the purposes of this application, these formats will be referred to as DVD+R and DVD+RW formats. The −VR formats were developed by a consortium of companies associated with the original DVD specification, but this latter format has little in common with the prior DVD format. For the purposes of this application, these formats will be referred to as DVD-R and DVD-RW formats or collectively as the DVD-VR formats. Data may be recorded in the −VR format in non-sequential blocks of data, and a file system used to locate blocks of data for playback. A manufacturer faces quite a challenge to provide a system, which may record and play back both +VR format and −VR format DVDs as well as other formats.

Adding to this challenge is the need in the consumer market to provide robust products, which are relatively immune to misuse by the consumer. Unlike PC or computer products, consumer products operate in an environment where the features need to stay simple and user-friendly. The operation of the apparatus needs to be robust, simple, and transparent to the user. One concern in recording DVDs at home is what can happen if the recording process is interrupted, for example, by a power failure, prior to completion of the process. As noted above, both +VR and −VR format systems record video data first, and then record navigation data (or file system data) afterwards. Without this navigation or file system data, the DVD may be difficult if not impossible to play back.

This problem may be a particular concern, as the user may be recording hours of video, and if the process is interrupted, find that most, if not all, of his video data is not accessible. For example, a power failure or the like could interrupt recording of a DVD/RW and thus prevent completion of the recording. The video data is present on the disk, but without updated navigation or file system data, the video data may be unreadable by a Prior Art DVD player. Similarly, in portable applications, such as a DVD/RW camcorder, batteries may be entirely depleted during the middle of shooting video, resulting in the video data being inaccessible to the user. A consumer may not accept such performance characteristics, particularly when comparing performance to such prior art devices as video-cassette recorders (VCRs). If power is lost to a VCR, the last data recorded to the machine is generally still accessible to the consumer—perhaps with the exception of the last seconds of video. However, with a Prior Art DVD recorder, minutes if not hours of video may be lost if the writing function is not completed.

FIG. 1 is a simplified diagram illustrating the relationship between stream information 130 and navigation information 110 in a DVD recorder. Referring to FIG. 1, DVD recording generally involves recording two types of information to the disc, stream information 130 and navigation information 120. Stream information 130 may comprise MPEG data, the actual video data itself. Navigation information 120 may comprise descriptive information, including structures called IFO files and file systems, which allow a playback device to properly locate stream information 130 on the disc.

During real time recording to an optical medium, recording stream information 130 in real-time as it is being input into the device is a common practice. Navigation information 120 may then be generated and written to the disc after the entire stream data 130 has been completely written. Writing of the navigation data 120 is deferred because navigation information 120 cannot be generated without having the entirety of stream information 130. Moreover, it is prohibitively expensive, in terms of access time, to seek to different locations on the disc for writing during the video recording process.

As a result, when a DVD recorder unexpectedly loses power, the recording in progress is often lost because navigation information 120 is never properly flushed to the disc, as illustrated in FIG. 2. In FIG. 2, a partial recording of video data 230 is made, interrupted by some event, such as a loss of power. In this instance, a substantial amount of video data 230 may be recorded, but no navigation information 220 is present. As a result, a Prior Art DVD player cannot read partially recorded video data 230, as the navigation information 220 is not present. If navigation data could be produced, then the partially recorded video data 230 might be recovered.

FIGS. 1 and 2 illustrate the general nature of the power failure or recording interruption problem for a DVD recorder. The specific nature of the problem varies, however, depending upon DVD recorder type (e.g., DVD-R, DVD-RW, DVD+R, DVD+RW, and the like). The following examples illustrate the specific nature of the problems created when a recording interruption event takes place for various different DVD recorder formats.

FIG. 3 is another simplified diagram illustrating how multiple or titles may be recorded to a DVD+RW and how navigation information is then written to the DVD+RW. In this example, each title may represent a separately recorded program segment or video segment. In this example, there are four chapters or titles, T1 through T4. After each title is recorded on the DVD+RW, the Navigation data 120 may be updated to include information describing the location of individual titles within video data 130. Navigation data 120 may also include various menus, which may be displayed to the user when playing back the DVD+RW, as well as pointers to various chapters, as well as any other information used to address video data on the DVD+RW. In addition, Navigation data 120 may include file system data which may be used to locate various files on the DVD+RW for use by a DVD player or for use by a computer when using the DVD+RW as a data disc or the like.

FIG. 4 is a simplified diagram illustrating how a power interruption or other interruption can affect a DVD+RW. In the Example of FIG. 4, recordation of video data is interrupted during recordation of title 4 at point 240, possibly due to a power failure or the like. As a result, the video data is not completely recorded. Moreover, the navigation data 220 may not have been updated (which normally occurs at the end of the recording cycle) and as a result no pointer to title 4 is present. Thus, while the video data for title 4 may be at least partially present on the DVD-RW, no pointer data has been inserted into the navigation data 220, and thus the video data for title 4 cannot be accessed. Access to titles 1–3 may still be possible, but access to the title being recorded during the power failure or other interruption may be denied.

In certain write-once media, prior recordings may also be lost as it becomes difficult to reload the previous state of the disc because of the incomplete information recorded prior to power off. Write-once media (e.g., DVD/R) as the name implies, can only be written to once. Unlike a DVD/RW, which can be written to and overwritten a number of times, write-once media can only be written to a single time.

In some instances, the DVD/R needs to be written to in one single session. If such a DVD/R is interrupted during the writing process, recovering lost video data in a manner to make the DVD/R playable on playback equipment may not be possible since new navigation data may not be able to be written to the DVD/R.

In other types of DVD/R discs, data may be written to the disc only once, but in a number of separate sessions. FIG. 5 is a simplified diagram illustrating how video and navigation data may be written to a write-once media in a number of sessions. As illustrated in FIG. 5, the write-once media may be separated into a limited number of "tracks", in this case at least two tracks, Track 1 and Track 2. Track 1 may be reserved for navigation data. This navigation data will not be written to the disc until all video data is recorded to the disc in one or more sessions. Once the disc is full or completed, the user may "finalize" the disc, in which case, the navigation information is then created and written to track 1 of the disc as shown.

Navigation information may be created from individual nav data associated with each video segment. In the example of FIG. 5, three video segments, Video 1, Video 2, and Video 3 have been recorded. After each video segment is recorded, associated nav data, Nav1, Nav2, and Nav3, is written onto the disc after its corresponding Video segment. When the disc is finalized, the nav data may then be assembled and recorded into the navigation file on track 1, as illustrated in FIG. 5. Each successive nav data may include nav data from all previous segments. Thus, the Nav2 data may include navigation data for Video1 and Video2, while the Nav3 data may include navigation for Video1, Video2, and Video3. When finalizing the disc, a Prior Art DVD recorder may create the Navigation data from the last Nav data segment, as it includes cumulative pointer and other data for all prior video segments.

FIG. 6 illustrates what happens if power is interrupted or some other event occurs to interrupt a write cycle to a DVD+R recorder. As illustrated in FIG. 6, during the writing of video segment Video3, the cycle is interrupted, perhaps by power failure or the like. As a result, no nav segment Nav3 is created. Moreover, the DVD recorder cannot finalize the disc, as the last nav segment nav3 was never created. As a result, an ordinary DVD player cannot read the DVD, and all video data on the disc may be inaccessible to the user. For consumer grade electronics, this situation is not an acceptable condition.

One prior art solution to this problem is to have a piece of non-volatile memory on the DVD recorder to record state information. The non-volatile memory retains information even when power is disconnected from the device. Once power is restored, the DVD recorder can examine the contents of the non-volatile memory and reconstruct the state of the recording prior to power loss and then reconstruct the navigation data and write it to the DVD.

The primary disadvantage of this solution is cost. Non-volatile memory devices impose a high cost to the DVD recorder. Another disadvantage is that the information in the non-volatile memory is tied intimately with the partial recording of one (or possibly a few) specific DVD discs. For example, if power is lost while recording disc A, then the device will store information about disc A in non-volatile memory. If a disc B is then inserted and information is video recorded onto disc B before recovering the contents of A, then the recorder will lose the ability to recover the data for disc A at a later time.

A brute force search is also a possible technique for recovering data. This brute force approach would require searching every addressable location on a DVD in an attempt to reconstruct the state of the disc prior to power off. However, as most DVDs typically hold over four gigabytes of data, the disadvantage of this technique would be that it is prohibitively slow. The user would become frustrated as the DVD recorder would take a relatively long time (e.g., half-hour) trying to read all four gigabytes of data on the DVD to reconstruct the lost video. The consumer may also think that the device has locked up, and the consumer may cause additional difficulty by turning off the device in the middle of such a brute force recovery mode Prior Art DVD/RW recorders typically are only able to read previously recorded data in the event of an unexpected power loss, but not the video data being recording at the time of power loss, as illustrated above in connection with FIGS. 3 and 4. Prior Art DVD/R recorders may also lose all of the data on write-once media if recording is interrupted. Consumers expect to be able to recover all video data up to the minute of interruption. Moreover, it is not sufficient in many applications to provide a solution only for one DVD format type, as consumers expect a modern DVD player/recorder to handle most DVD formats. Thus, it remains a requirement in the art to provide a DVD recorder, which can quickly recover lost video data in an efficient and cost-effective manner.

SUMMARY OF THE INVENTION

The present invention solves the aforementioned problems of the prior art by providing a number of different subroutines or algorithms for locating lost video data, reconstructing navigation data, and creating new navigation files or the like so that the DVD may be made readable by an ordinary DVD player.

The present invention provides algorithms to recover video data for each of a number of different DVD formats, so that video data may be recovered regardless of which DVD format was being used at the time (e.g., DVD+RW, DVD+R, DVD-RW, DVD-R, or the like). In addition, the present invention provides a number of other algorithms that be used by one or more of the different recovery algorithms to recover various aspects of data from a disc. The combination of these algorithms provides a complete package of data recovery techniques that allows for video data to be recovered in the event of a power loss or other interruption, and in most instances, creates recordable DVD which may be subsequently read by other DVD players and the like.

DETAILED DESCRIPTION OF THE INVENTION

The system and method of the present invention comprises a number of algorithms of subroutines which enable data recovery from a DVD or the like where recording has been interrupted prior to completion of the recordation cycle. A number of different subroutines are provided to perform different functions as well as accommodate the different data formats and standards discussed above. A first algorithm comprises a method for Stream Traversal to recover data from a DVD. Subsequent algorithms may use this stream traversal technique to recover data for different DVD formats.

Stream Traversal is the algorithm used to reconstruct stream information that is previously recorded. Streams compliant to the DVD and DVD like recording standards store video information in units called VOBUs (Video Object Units). Each VOBU typically encodes a small fixed duration of video between 0.4 to 1.0 seconds and comprises a number of MPEG-2 frames. The VOBUs are arranged linearly on the recordable DVD. In order to generate the navigation information that corresponds to a stream, precise measurements of the locations of all of the VOBUs are necessary. This information occupies on the order of hundreds of kilobytes. This information is typically captured during recording but is lost after an unexpected power off. Stream Traversal leverages the navigation packs stored inside the VOBUs.

Figure 7:
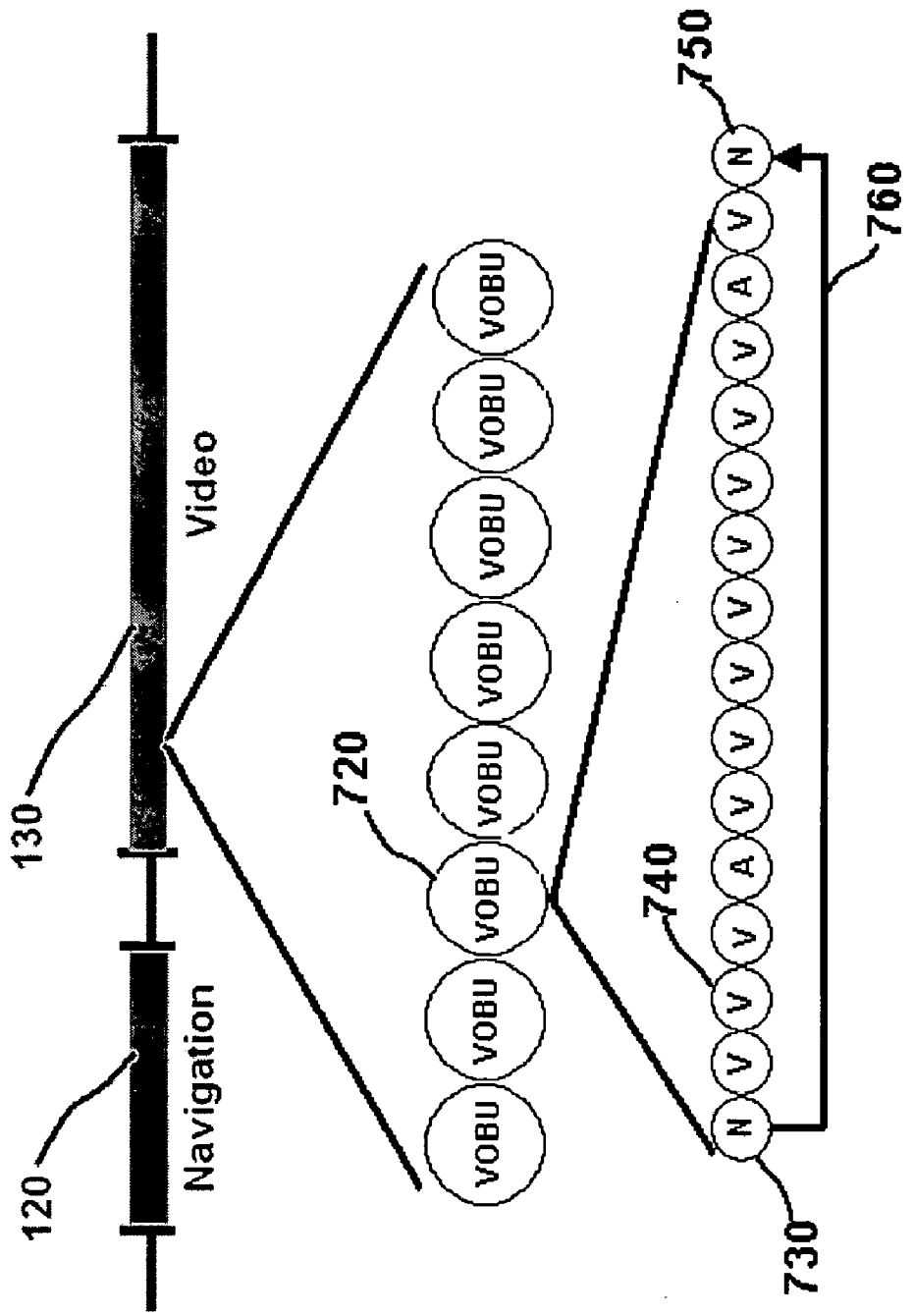
FIG. 7 is a diagram illustrating the arrangement of data on a DVD.

FIG. 7 is a diagram illustrating the arrangement of data on a DVD. As was illustrated generally in FIG. 1, video stream data 130 may be recorded separately from navigation data 120, the latter data of which is recorded after the video stream data 130 is completed. Video stream data may comprise a plurality of VOBUs 720 as illustrated in FIG. 7. Each VOBU 720 may comprise 0.4 to 1 second of video data, as is known in the art. As illustrated in FIG. 7, each VOBU 710 may comprise a number of MPEG-2 frames of about 2 kilo Bytes each. The MPEG-2 frames may comprise video (V) frames 740 as is known in the art, as well as "navpacks" (N) 720 and 750 as is known in the art. The actual arrangement and number of video frames and navpack frames may vary depending upon content and encoding, and the illustration in FIG. 7 is thus by way of example only. Each navpack contains internal navigation data that may be used to navigate the data stream. In the example of FIG. 7, navpack 730 has a pointer 760 which points to the next navpack 750 in the data stream.

Navigation packs 730 and 750 are special portions of the stream that are located at the very beginning of each VOBU, and their format is defined by the DVD specification. One key piece of information stored in navigation pack 730 is a pointer 760 that points to the location of the next navigation pack 750. In the present invention, the DVD recorder can recover information about all of the VOBUs by starting at the first navigation pack and following the chain of navigation packs until no more valid navigation packs are found. In order to traverse the stream, the DVD recorder needs to retain the location of the first navigation pack even in the event of an unexpected power loss. Once the stream traversal has taken place, navigation data is available which may be used in conjunction with one or more of the following algorithms to recover all of the video data for a particular lost segment.

The stream traversal technique alone may not be sufficient to recover video data segments and make a DVD readable to a DVD player. For different DVD types, different algorithms are required to fully recover the video data. In a second algorithm, power off data recovery is provided for rewritable media (e.g., DVD+RW).

Figure 3:
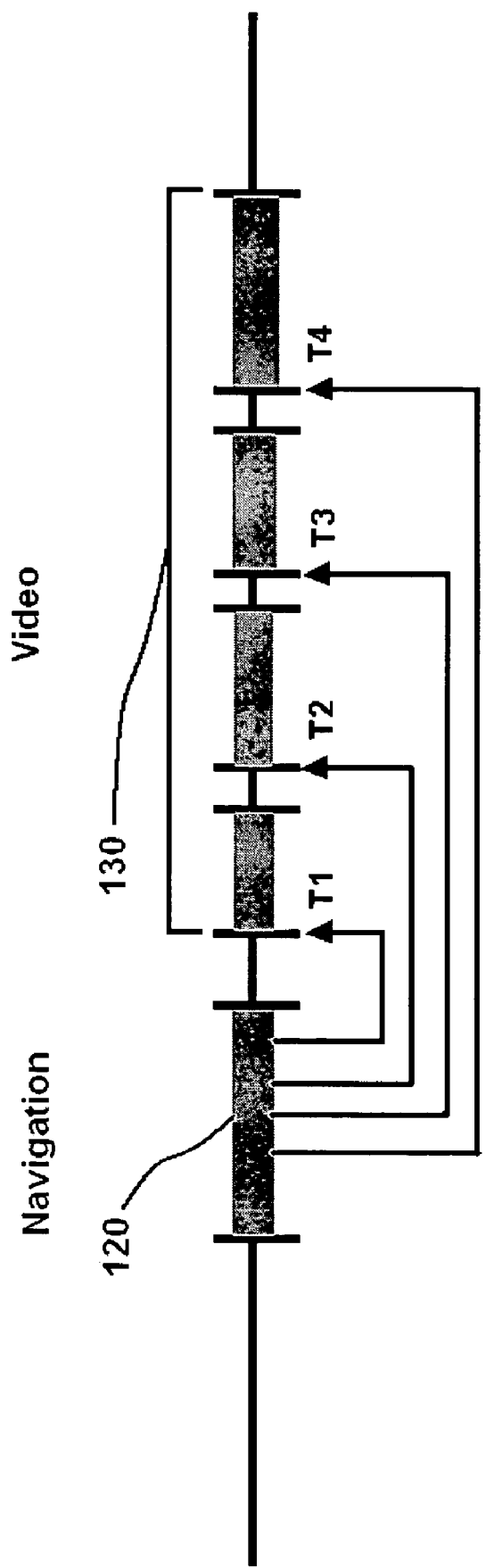
FIG. 3 is another simplified diagram illustrating how multiple chapters or titles may be recorded to a DVD-RW and how navigation information is then written to the DVD-RW.

As noted above in connection with FIGS. 3 and 4, navigation information is typically stored near the beginning of a rewritable DVD+RW media. The navigation information is often located at a fixed location at the beginning of the disc. Typically, this information is updated at the end of each recording. For example, a disc containing four recordings, or "titles", might contain: (navigation information) (title 1) (title 2) (title 3)(title 4) as illustrated in FIG. 3.

Figure 4:
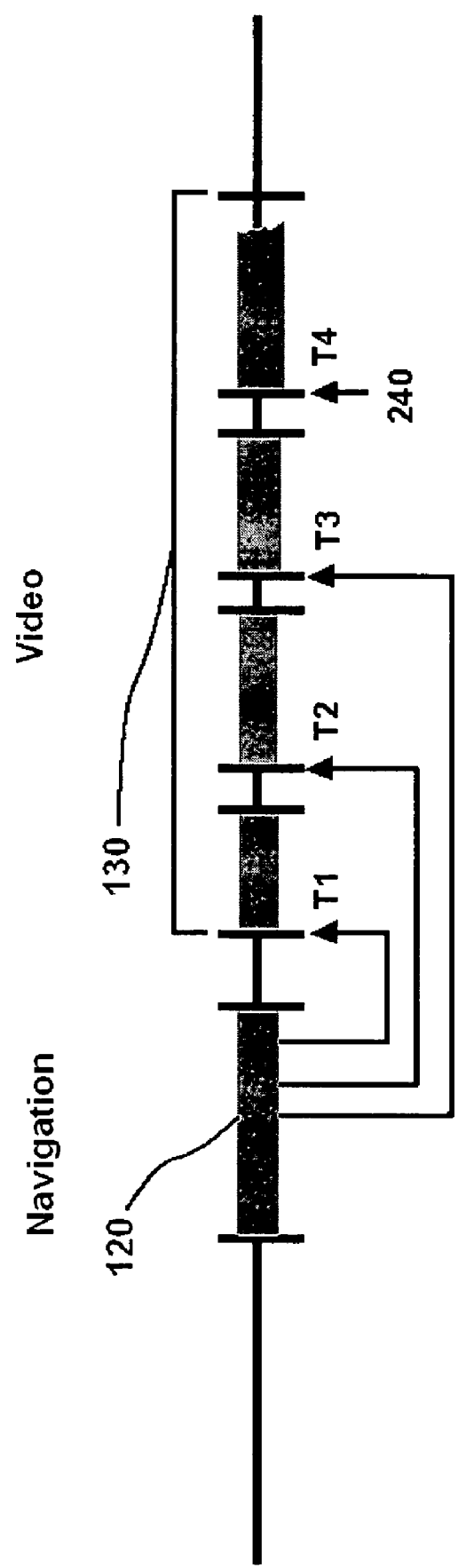
FIG. 4 is a simplified diagram illustrating how a power interruption or other interruption can affect a DVD-RW.

As illustrated in FIG. 4, when an unexpected power-off or other interruption condition occurs, the navigation information, or "state" information, for the last partially recorded title (title 4) is lost. For example, as illustrated in FIG. 4, if power off occurred during the writing of title 4 the disc might look like this:(state for titles 1 & 2 & 3) (title 1) (title 2) (title3) (partial title 4).

A Prior Art DVD recorder can easily recover state information for the previous recordings (title1 through title3) in the rewritable media case by operating as normal and reading the appropriate locations on the disc. However, a Prior Art DVD player will be unaware of the partially recorded title4. In order to recover the partially recorded title4, an extra flag according to the present invention is stored on the disc to indicate that there is a partial recording on the disc. The DVD recorder sets the value of the flag to 1 prior to the start of recording and reverts the flag to 0 after recording has completely finished. If a power off condition occurs during recording, the flag will subsequently be discovered to contain the value 1.

Figure 8:
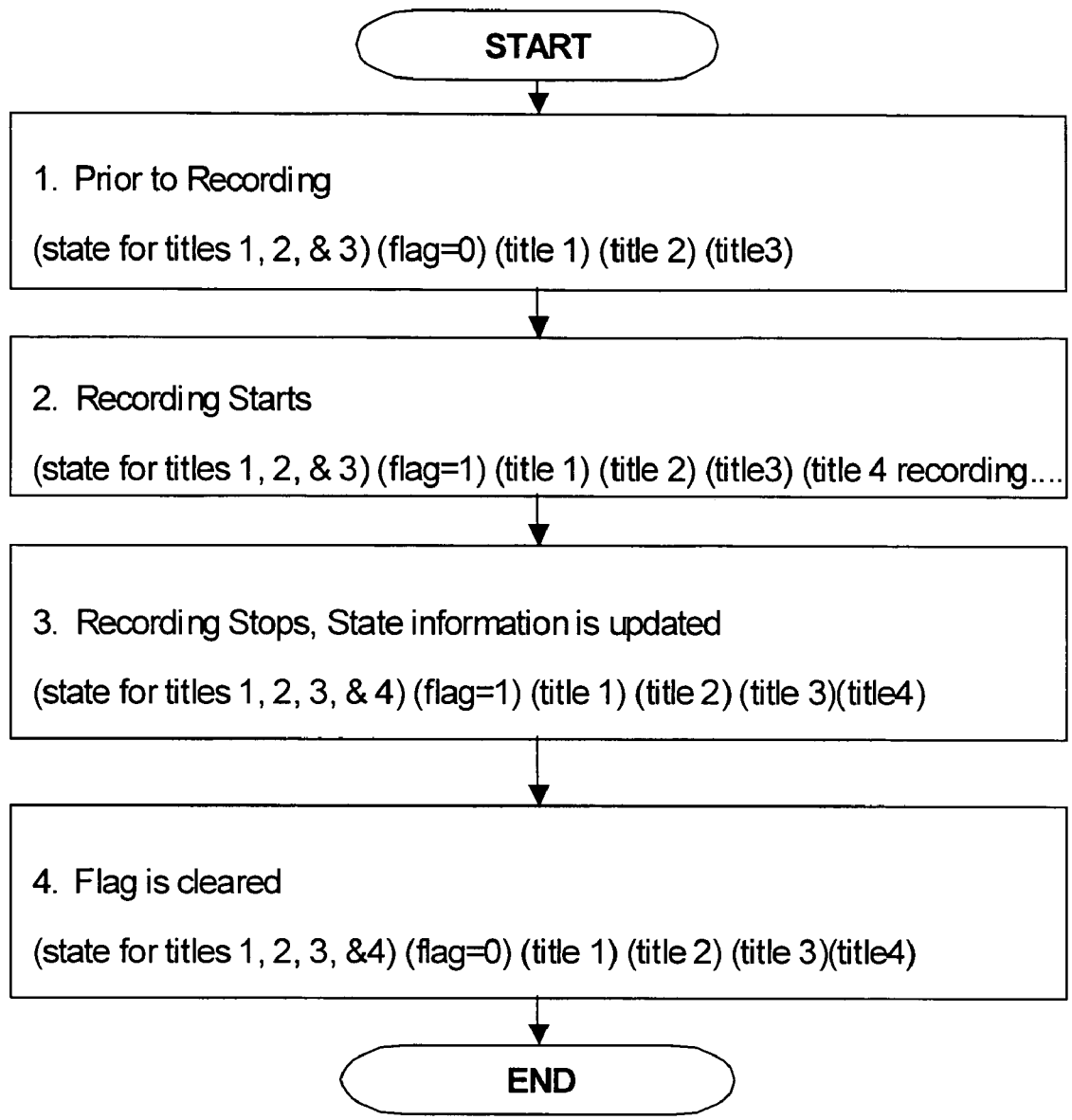
FIG. 8 is a flowchart illustrating the steps in setting an indication flag during writing of data to a DVD such that power interruption or other interruption can be detected.

An example of one recording cycle may comprise the steps illustrated in the flowchart of FIG. 8. In step 1, prior to recording, the recording flag may be set to 0, indicating that no recording activity is going on. In this example, following the example of FIGS. 3 and 4, three existing titles are present on the disc, (title 1) (title 2) (title3), and navigation data for these titles is already written to the disc. In step 2, recording starts, and the flag is set to 1, which signifies a recording event is occurring. If power is interrupted at this point, or some other interruption occurs, the flag will remain at 1, indicating to the DVD recorder/player that such an interruption has occurred the next time the disc is read. The navigation data at this stage only contains data for titles 1–3, and the title 4 data is being recorded. In step 3, recording stops, and state information is updated in the navigation data file for titles 1, 2, 3, & 4. The flag is still set to 1, and all four titles (title 1) (title 2) (title 3) (title4) have been recorded to the disc. In step 4, the flag is cleared (set to 0) and the recording process is completed.

When the DVD recorder of the present invention loads a disc and finds that the value of the flag is zero, then the DVD is confirmed to be in a consistent state. If the flag is 1 (as in Step 2 above), then the recorder has been signified of an unexpected power off or the occurrence of another type of interruption. If the recorder stores some critical pieces of information about the new recording alongside the flag, then it can leverage this information and stream traversal to recover the partially recorded title. The critical pieces of information are pieces of information determined at the start of recording that may be difficult to reconstruct later. These items often include descriptive information about the new title being recorded, such as the start location of the new title, a text name, the time of recording, and the particular hardware settings used to generate the stream.

This information can easily be stored alongside the flag on a rewritable media and be leveraged with stream traversal to recover partial recordings. In the Navigation data 120, as defined by the various DVD specifications, a number of undefined data fields, which may be used to store such a flag and associated data, exist. Alternately, the flag may be stored in a file on the disc, provided the file name is not one already used by the DVD file system. In one embodiment of the present invention, this data may be stored in the video_rm directory under the name sonata.ifo.

The above algorithm can be refined one step further into the final algorithm. A small window of time exists at Step 3 when power loss or other interruption can occur and corrupt the state of the disc. During this step, the recorder is in the process of updating the navigation information to reflect the new recording. If this step is interrupted, the state of the disc will be inconsistent, as the flag may be set indicating that recording is incomplete, when in fact it has been completed, while the navigation data may not be finalized.

This problem can be solved through the use of a backup copy of the state information and one additional value to which the flag variable can be set. The recorder may then change the value of the flag immediately before the state information is updated and once after the state information is successfully written.

Figure 9:
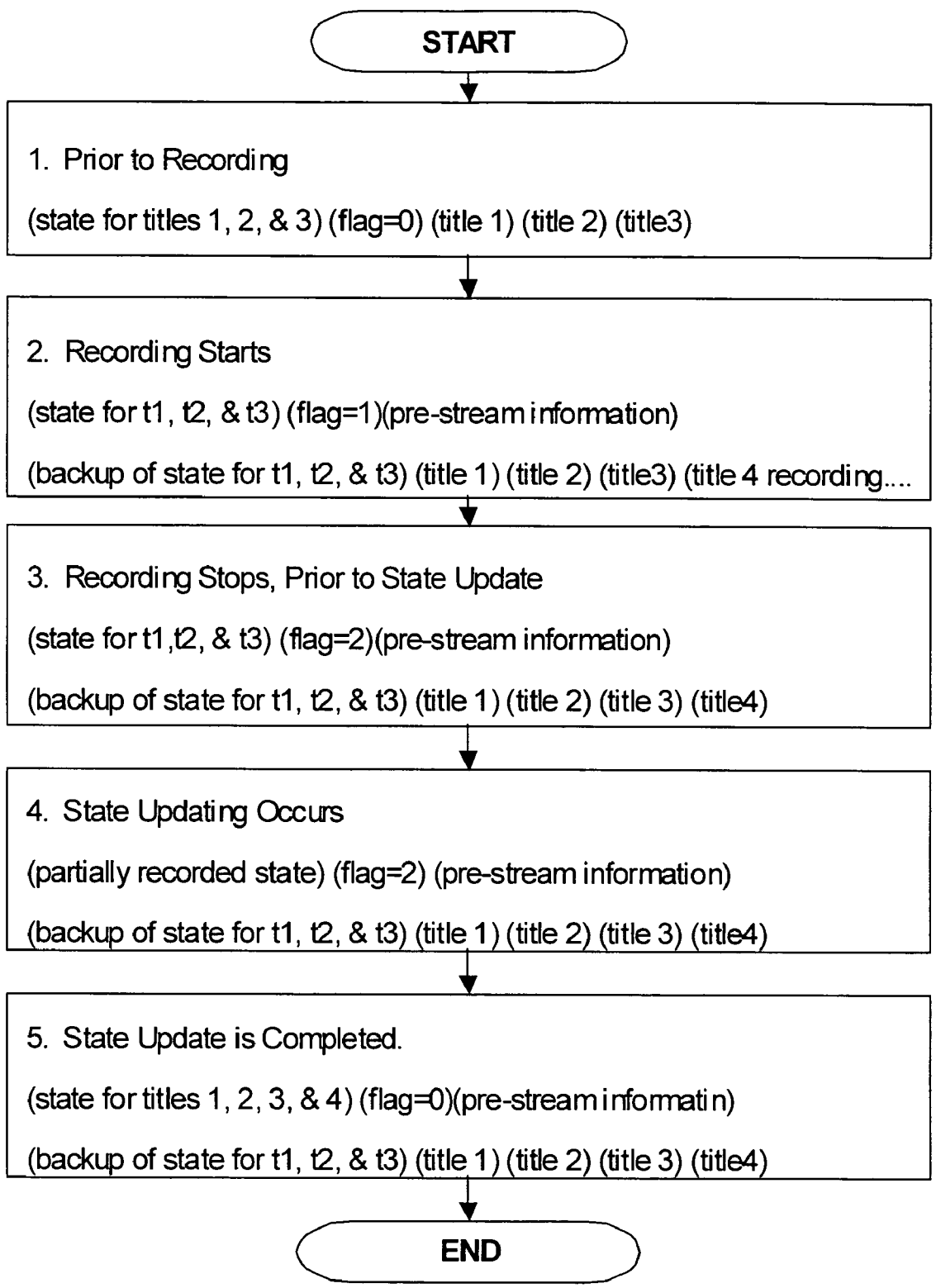
FIG. 9 is a flowchart illustrating an advanced indicated flag having multiple states so as to indicate whether video data has been competed as well as navigation data.

FIG. 9 is a flowchart illustrating an advanced indicated flag having multiple states so as to indicate whether video data has been competed as well as navigation data. The process of FIG. 9 comprises the following steps. Again, in this example, three titles are already recorded on the disc, and the example illustrates what happens when a fourth title is added. In a first step, prior to recording, the navigation data contains state information for titles 1, 2, and 3 as illustrated in step 1 of FIG. 9. The recoding flag has been set to 0, which signifies that no recording it taking place. In step 2, recording starts and the recording flag is set to 1, which means that recording of video data is taking place. Pre-stream information and a backup copy of the state information for t1, t2, and t3 may be recorded in the flag file or in the navigation data, and the video data for title 4 may be recorded to the disc. In step 3, recording of video data stops, but the navigation data has yet to be updated. Thus, the recording flag is set to a third value (e.g., 2) indicating that video data has been recorded but that the navigation data has not been updated yet. In step 4, the state information for titles t1-t4 are updated, and the recording flag stays at 2. When the navigation data has been completely updated in step 5, the recording flag is then set back to 0 indicating recording has been completed. The video data and navigation data are complete, and the DVD may be read by most DVD players.

However, if a power interruption or other event occurs to interrupt recording, then the state of the flag will indicate that such an interruption has occurred, and moreover, whether the interruption occurred during recording of video data or during recording of navigation data. If the DVD recorder loads a disc and finds that the value of the flag is 2, then it will be signified of the occurrence of a power off condition during the update of state information, e.g., Step 3 or Step 4. The DVD player will be signified of the fact that the state information will likely be inconsistent and untrustworthy. To account for this situation, the DVD player will fall back and read the backup copy of the state in order to recover the state of the disc prior to recording. The DVD player will then use the pre-stream information and stream traversal to recover the newly recorded title and update the navigation information so that the DVD may be properly read from thereafter. If the recording flag is set at 1, then the DVD player will be signified of the occurrence of the recording interruption during writing of the video data, and suitable techniques such as stream traversal, as discussed above, can be used to make the video data readable on the disc by updating the navigation data.

The second algorithm discussed above is suitable for use with DVD+RW discs, which are rewritable a number of times. The navigation data on a DVD+RW discs can be overwritten to correct for errors induced when recording is interrupted. However, for a DVD+R disc, data can only be written once. Thus, the DVD player of the present invention provides yet a third algorithm to provide power off recovery in write once media.

Figure 5:
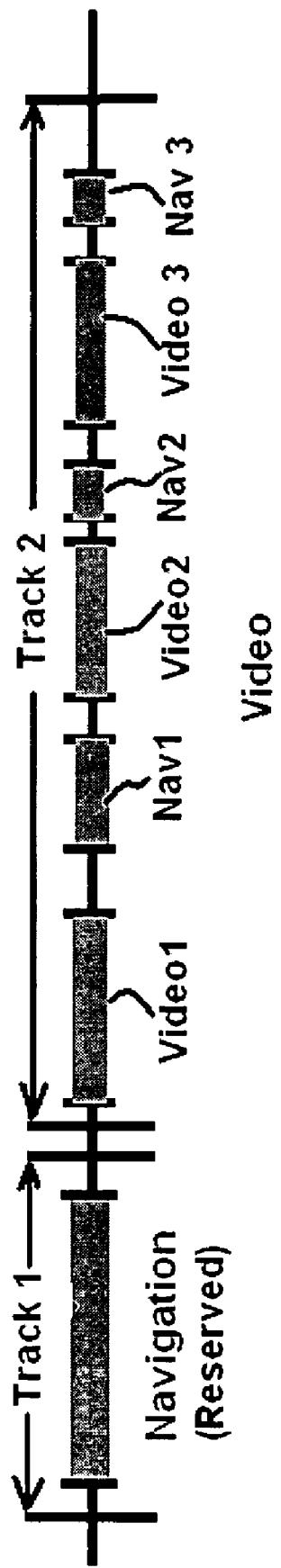
FIG. 5 is a simplified diagram illustrating how video and navigation data may be written to a write-once media in a number of sessions.
Figure 6:
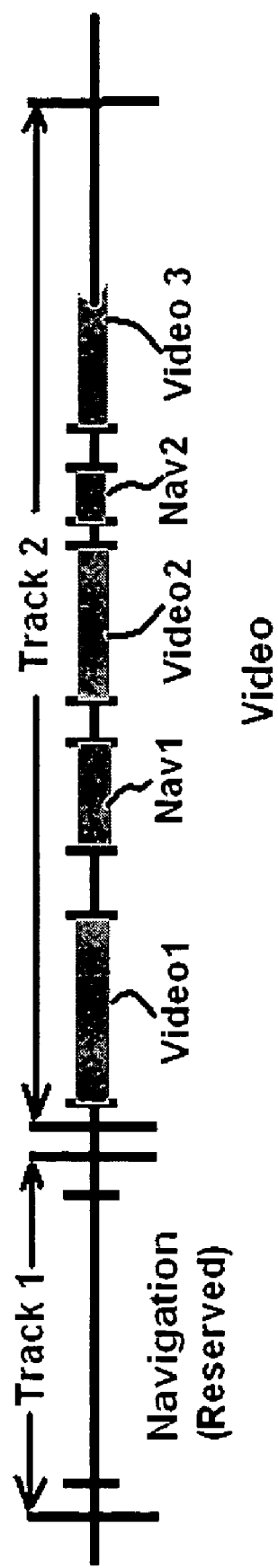
FIG. 6 illustrates what happens if power is interrupted or some other event occurs to interrupt a write cycle to a DVD-R recorder.

Recording video on write once discs differs from recording on rewritable media in that the navigation information can not be repeatedly updated to the beginning of the disc. The common technique used involves recording the most recent copy of the navigation state information after each new title. As illustrated in FIGS. 5 and 6, media that supports "tracks" have the added advantage of partitioning each new title to one or more tracks of data. A track is a contiguous subset of data. FIGS. 5 and 6 illustrate a disc with two tracks of data, although other numbers of tracks (e.g., 3, 4, or more) may be used.

Typically, the first track, Track 1, is reserved for future use. After all the titles (Video 1 through Video 3 in the example of FIG. 5) are recorded, a "finalization" step is used to copy the final navigation state information into Track 1, thus creating a valid DVD which may be read on most DVD players. FIG. 5 illustrates an example of such a write-once disc. In the example of FIG. 5, after each video segment is recorded (Video 1, Video2, Video3), a corresponding Navigation or Nav segment is recorded (Nav1, Nav2, Nav3). Each video segment may represent a different "title" being recorded, while each nav segment may contain navigation state information for the corresponding video segment, and each preceding video segment.

Thus, for example, navigation state segment Nav1 may include state information for the first title Video 1. Navigation segment Nav2 may include state information for the first and second titles Video1 and Video 2. Navigation segment Nav23 may include state information for the first, second, and third titles Video 1, Video 2, and Video3. Each navigation segment may include pointer information indicating the start of the corresponding video title, as well as other navigation information needed to locate and playback the corresponding and preceding video titles.

After all of the video titles have been recorded, the disc may be "finalized" and a navigation file created in Track1. Once this navigation file has been created, most ordinary DVD players may be able to read the disc. Most ordinary DVD players will ignore interim nav files Nav1, Nav2, and Nav3 after the navigation information has been finalized into a master Navigation file.

In the present invention, recovery of data from a power interruption or other interruption in recording of a write once media is achieved using a third algorithm as follows. The DVD recorder finds the last track with a valid copy of the navigation state information at the end. This state reflects the state prior to unexpected power off. FIG. 6 illustrates an example of a write once disc where an interruption in the writing process has occurred. In this example, navigation state information file Nav2 is the last valid copy of navigation state information. The navigation state information file Nav2 can be located by looking for unique characteristics of a navigation state information file, such a particular data patterns used in navigation state files.

Once the last valid Nav file is located, the DVD recorder can use the Stream Traversal algorithm, as disclosed above, on any subsequent tracks to attempt to recover any partially recorded title. In the example of FIG. 6, this partially recorded title is Video3. Other pre-stream data such as title names, and recording times can be recorded at the beginnings of Tracks prior to recording start. Once the navigation data is recording to Track 1, the disc is now readable by most DVD players, and all of video titles Video 1 and Video 2 (in this example) can be read in their entirety. The interrupted video title, Video 3 can also be read, substantially up to the point of recording interruption.

Figure 10:
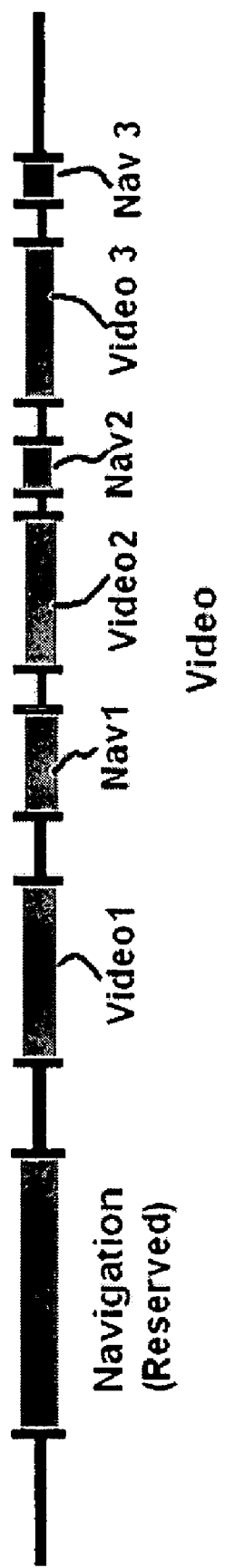
FIG. 10 illustrates what write-once disc without tracks might look like after a complete recording of three titles.
Figure 11:
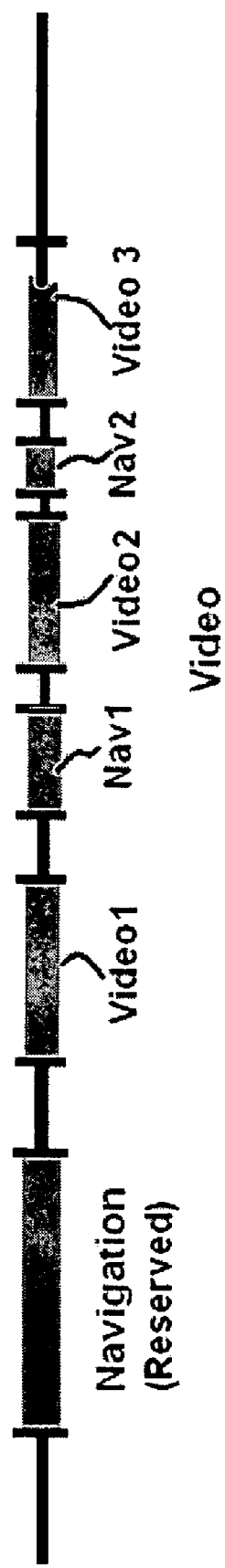
FIG. 11 illustrates what write-once disc without tracks might look like after a complete recording of two titles, and an incomplete recording of a third.

A fourth algorithm is provided in the present invention to provide data recovery for write-once media without tracks. Some types of write once media only support a small number of tracks. This forces the recording of different titles to occur all in the same track. This is a disadvantage because it hinders the addressing of individual titles in the event of power failure. FIG. 10 illustrates what such a disc without tracks might look like after a complete recording of three titles. FIG. 11 illustrates what write-once disc without tracks might look like after a complete recording of two titles, and an incomplete recording of a third.

Unfortunately, in a write-once media without tracks, locating the state information in the event of a power loss becomes prohibitively expensive in terms of processing time, because of the lack of tracks. Performing a linear search starting from the back of the disc to the front is then required in order to locate the last valid copy of state information (in the example of FIG. 11, Nav2). In this case, the search would depend linearly on the length of partially recorded title Video3. A reverse Stream Traversal can be performed after finding the last valid VOBU in Video3. However, this step is time consuming and would be required just to load the state of the DVD.

In all previous examples, the state of the disc can be quickly loaded, as the location of the interrupted portion can be narrowed down using the algorithms illustrated herein. Stream traversal would only be used to recover the partially recorded title, not for searching for state information. One solution is to make a DVD recorder, which would offer, as an option to the end user, the ability to recover the last recording, since last recording recovery is a time consuming process. At the minimum, previous recordings can be quickly recovered since their Nav information is undisturbed, as illustrated in FIG. 11. The user could then opt out of recovering the last recording, which would be a time-consuming process. In the trackless write-once case, stream traversal would be necessary just to recover the previous recordings, and this way of recovery is unacceptable from a user's perspective, as it might take fifteen minutes to a half-hour just to recover the last video track information data from one disc.

The solution to this problem is to store pre-stream information, such as the stream start location, in certain unused locations inside the stream itself. One example would be to store this information in unused areas of the navigation pack itself, such as the last 471 bytes of the navigation pack. Again, referring to FIG. 7, the relationship between navigation and video data, VOBUs, and navpacks are generally illustrated. In this embodiment of the present invention, the location of the last valid copy of the state information, and possibly the location of the stream start are embedded into one or more navpacks. The state information and location of stream start may be each typically 4 bytes in length, and thus can easily fit within the unused and undesignated space of a navpack.

This fourth algorithm or technique reduces the searching time to a constant amount of time per search, as opposed to a linear amount of time that is proportional to video stream length. If the information is stored once per VOBU in the navpack, the DVD recorder has to search at most the length of the largest possible VOBU size. One drawback with placing information into the navpack is that it is often difficult to find a convenient place to store the information inside the stream without violating one of many DVD standards or specifications. However, in practice, leveraging these unused portions will not lead to playback issues when playing back the recorded DVDs since players are frequently designed to ignore undesignated or undefined unused bytes of data that contain no useful information.

Figure 12:
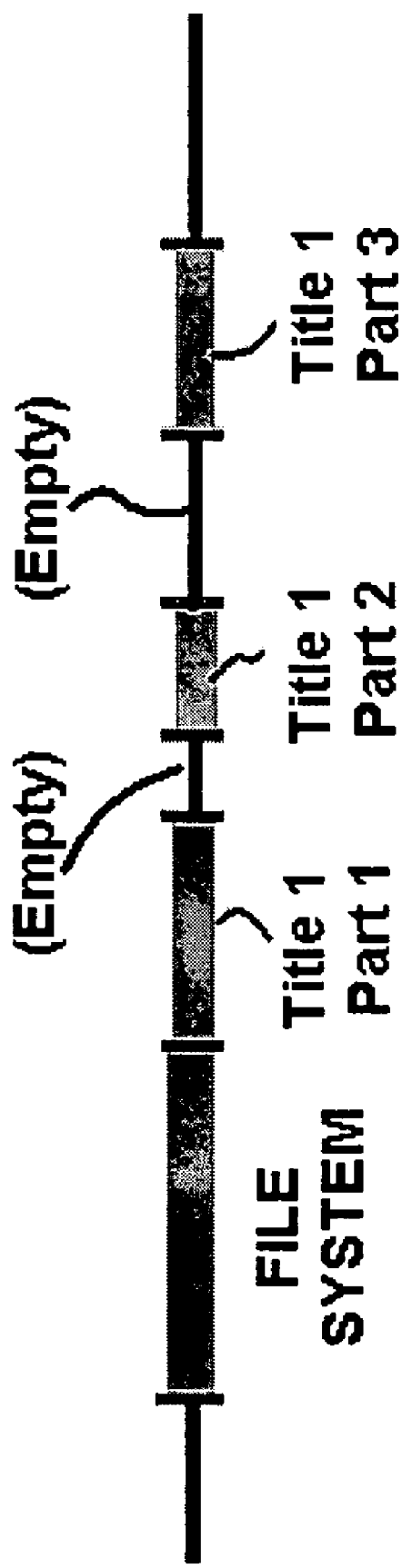
FIG. 12 illustrates an example of a DVD-VR disc after one title has been recorded.

A fifth algorithm is provided in the present invention to cover the case of data recovery in –VR format recording (e.g., DVD-R and DVD-RW formats). As discussed in the background of the invention, the –VR formats differ substantially from the original (read only) DVD format, even though the consortium which created the –VR specification was the same one that created the original (read only) DVD standard. DVD-VR differs from read-only DVD in that the video for each title is no longer restricted to be in a contiguous block. Instead, the video may be located in several portions described by the file system. In this aspect, the DVD-VR formats are similar in some respects to hard drive storage techniques, as random-access of different file segments or portions is required in order to read data from the disc. FIG. 12 illustrates an example of a DVD-VR disc after one title has been recorded. As illustrated in FIG. 12, the first portion of the disc may contain the file system, which includes pointers not only to individual titles, but also to individual title segments. A single title may be stored as a number of parts or segments (e.g., Parts 1–3 as in this example) at different locations on the disc.

Figure 13:
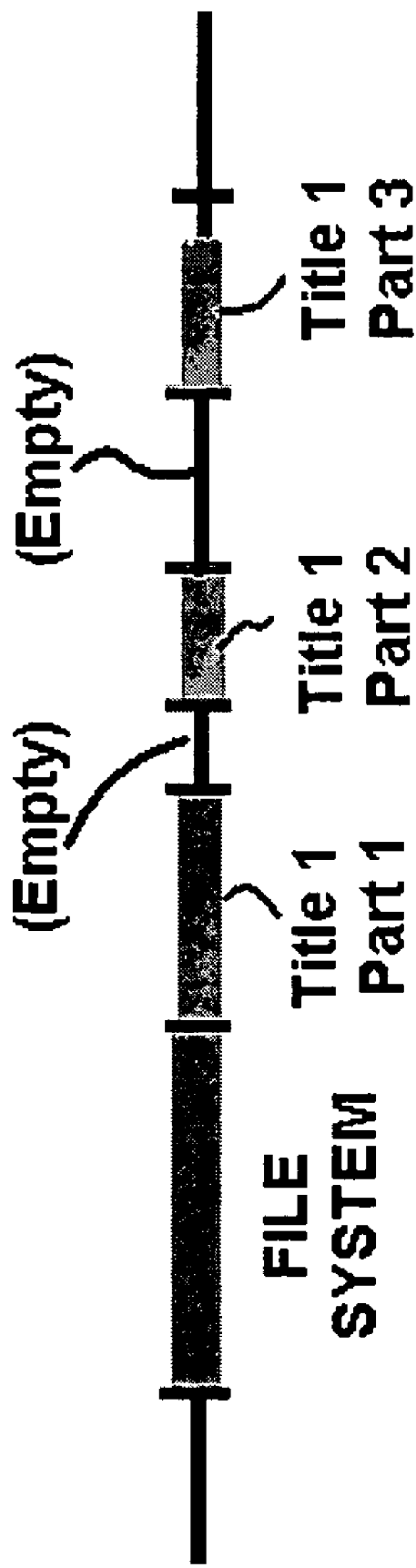
FIG. 13 illustrates the effect of a power interruption or other interruption during recording to a DVD-VR disc.

FIG. 13 illustrates the effect of a power interruption or other interruption during recording to a DVD-VR disc. As illustrated in FIG. 13, Title 1 may be divided into a number of segments, in this example, parts 1 through 3. If power is interrupted, for example, during recording of part 3, the entire title might not be readable, as the file system may not be updated with some or all of the navigation information for any or all parts of Title 1.

The use of the stream traversal algorithm in a DVD-VR disc is hindered, as it is difficult, or impossible to predict precisely at stream generation time the precise location of the next VOBU on the disc, as each title may be segmented into several parts. As a result, performing stream traversal becomes difficult and/or excessively time consuming since any two VOBU might have several segments of empty space between them.

Figure 14:
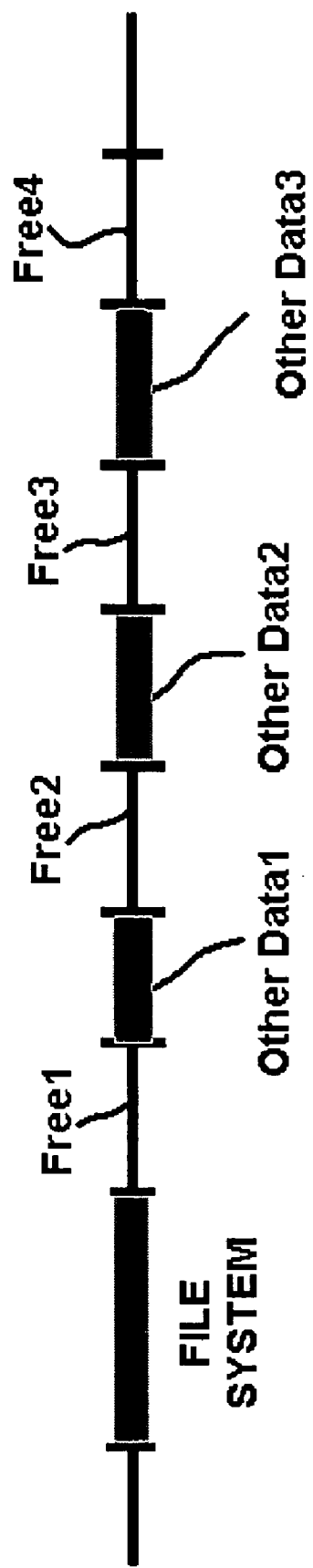
FIG. 14 is a diagram illustrating the arrangement of data on a DVD-VR disc using the deterministic algorithm of the present invention.
Figure 15:
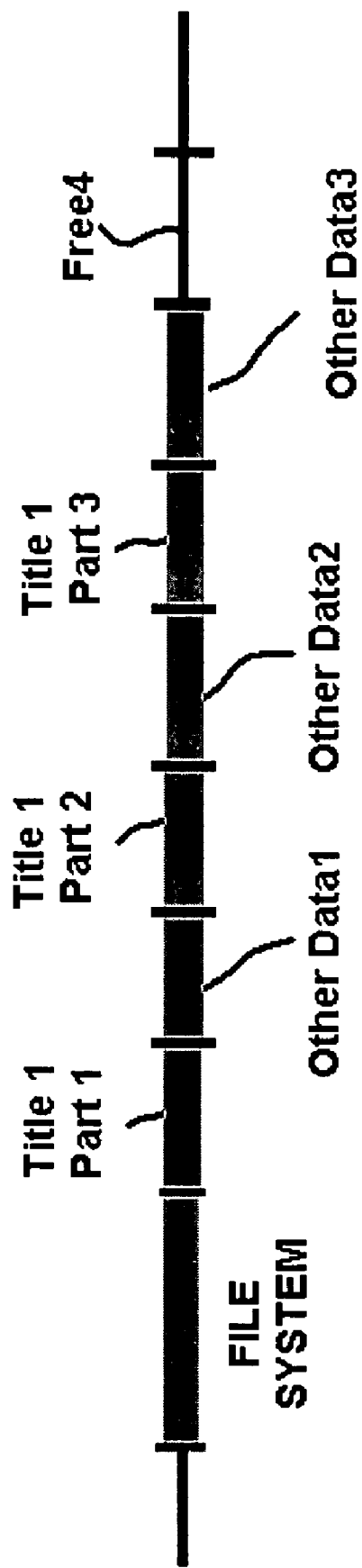
FIG. 15 illustrates a representation of data once three segments of Title 1 are recorded to the disc.

The present invention solves this solution by using a deterministic algorithm to allocate free space in the recorder. FIG. 14 is a diagram illustrating the arrangement of data on a DVD-VR disc using the deterministic algorithm of the present invention. In the example illustrated in FIG. 14, three segments of free space, FREE1, FREE2, and FREE3 might be allocated on the disc for a new title to be recorded. Once the three segments of Title 1 are recorded to the disc, the data may be represented as illustrated in FIG. 15, where the three allocated free spaces are replaced with Title 1, Part 1, Title 1, Part 2, and Title 1, Part 3.

If the system deterministically allocates the free space, it is possible to reconstruct new recordings using the Stream Traversal algorithm in the ideal case. One possible deterministic algorithm would be as follows. First, the free space is scanned from the beginning to end for a first contiguous block which contains a suitable minimum size such as four megabytes. This block will be the first block that is used.. Second, once that block is consumed, the system scans the free space from the previously used block to the end for the next block of four megabytes in size. This second step is repeated until all four-megabyte blocks are exhausted. Pointer information in the navpacks within the VOBUs of the title segments may point to a next title segment in the chain, and thus, the video data can be reconstructed even though the title has been fragmented into segments. Detection of unexpected power off would use the flag discussed above in connection with the second algorithm.

Figure 16:
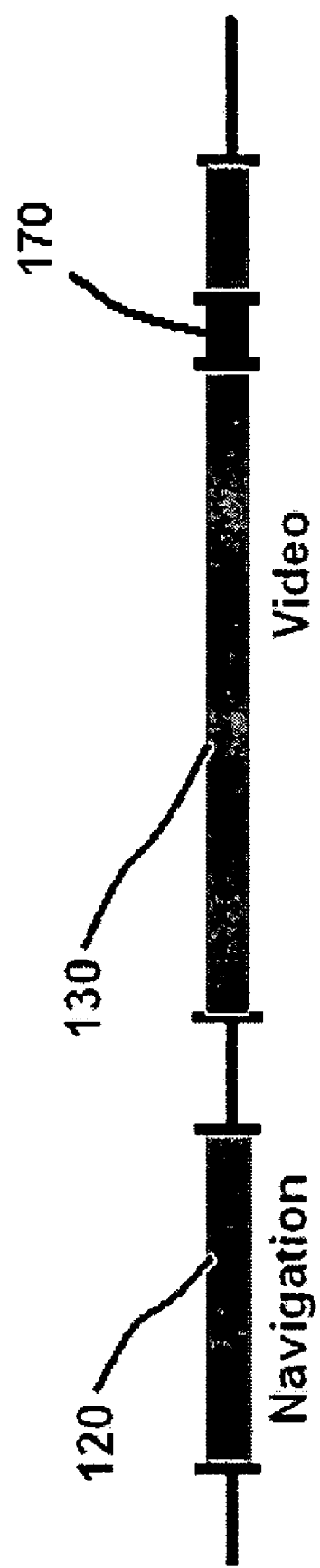
FIG. 16 illustrates how a defect may be marked off on a DVD-VR and a title segment recorded around the defect.

Unfortunately, there are instances in DVD-VR recording, which are not ideal. For example, the system may divide up segments of video during recording time if there are defective locations on the disc. In a similar manner to which a hard drive marks off bad sectors on a magnetic disc, the DVD-VR system may mark off bad sectors on a DVD-VR disc and record around these segments. FIG. 16 illustrates how a defect may be marked off on a DVD-VR and a title segment recorded around the defect.

Figure 1:
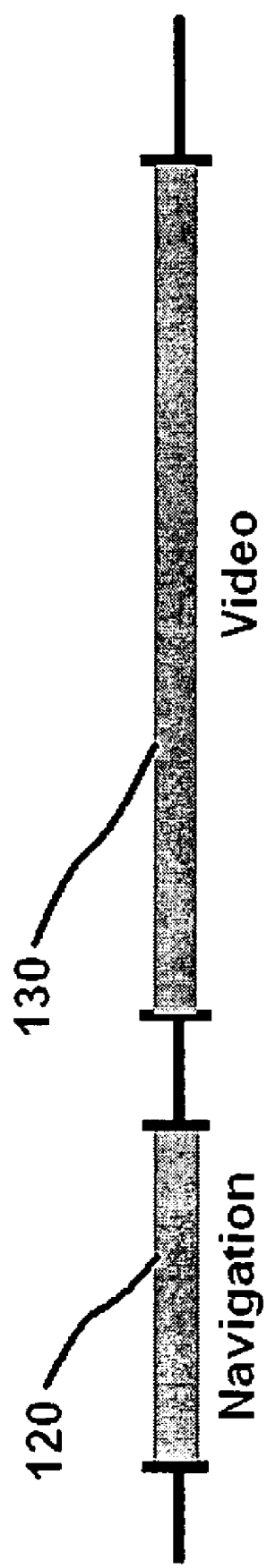
FIG. 1 is a simplified diagram illustrating the relationship between stream information and navigation information.
Figure 2:
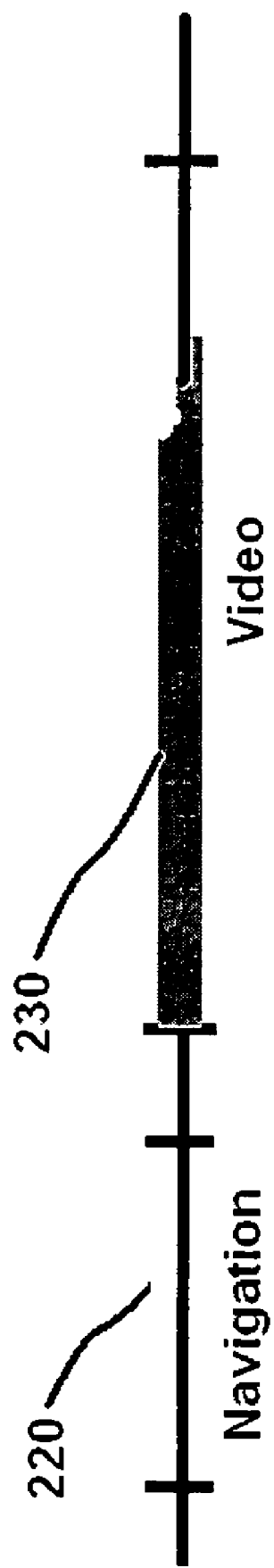
FIG. 2 illustrates a partial recording of video data interrupted by some event, such as a loss of power.

For example, a title normally recorded as illustrated in FIG. 1 may be recorded as illustrated in FIG. 16 if a defect 170 in the disc is detected. As illustrated in FIG. 16, the location of the defect 170 is marked, and the video data is recorded around the defect. In other DVD formats, navigation data is often recorded redundantly. For example, in the DVD+R format, the nav files contain cumulative navigation data. If one navigation file is recorded on a defective segment, other navigation files may be used to reconstruct navigation data. Video data in MPEG-2 format is inherently redundant, as missing frames can be reconstructed by either repeating a previous frame or interpolating between two adjacent frames.

However, in a DVD-VR embodiment, the use of fragmented data files and the underlying file system provides less of a redundancy, and thus detecting and marking bad segments is more critical in a DVD-VR environment. One drawback to the DVD-VR approach is that it is impossible to determine the location of defects without first attempting to write to the location and determining it is defective. The locations of these defects are not known when performing Stream Traversal and can be difficult to detect during stream traversal.

In the present invention, the solution to this problem is to fall back to linear search techniques when Stream Traversal fails to find a VOBU at an expected location. If defects are rare, then this searching process adds a negligible cost to stream recovery. In addition, the system can use a special "segment" pack to record the boundaries of several previous segments of data. This approach identifies for the Stream Traversal algorithm the precise location of the last segments of data and the precise locations of defects once the "segment" pack is located.

Figure 17:
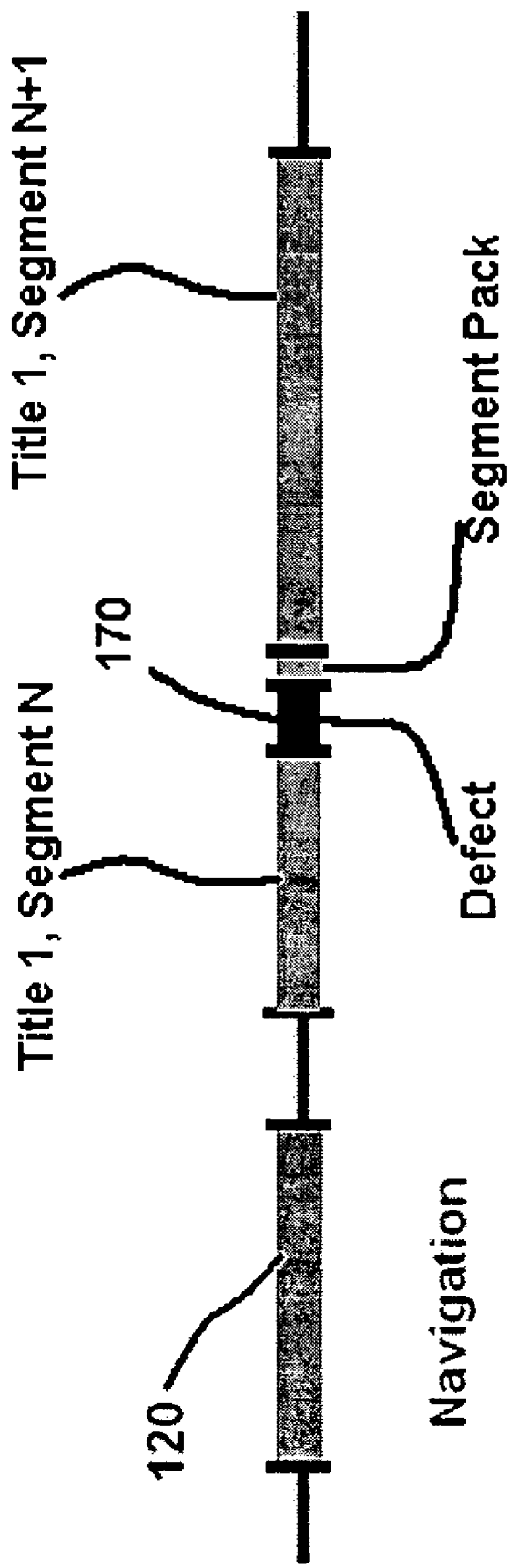
FIG. 17 illustrates how a defect point in a recording might be marked and a segment pack inserted in the present invention.

\FIG. 17 illustrates how a defect point in a recording might be marked and a segment pack inserted in the present invention. In operation, a Stream Traversal technique is used to locate the last VOBU in title 1. However, ordinary Stream Traversal would fail at the last VOBU of segment N because of the defect. In the present invention, the system performs a linear search until the segment pack is encountered. The segment pack clearly defines the boundaries of segment N as well as the boundaries of the defect, and possibly the beginning of segment N+1. Stream Traversal could then continue normally, and the data may be recovered. The file system may be updated to include the new locations of the titles and title segments, and the DVD-VR disc can be made recoverable.

As illustrated above, a suite of algorithms may be employed to create a system by which a DVD recorder can recover lost video data, update the navigation information, and make the resultant disc readable on a typical DVD player. As each DVD recording format (DVD+R, DVD+RW, DVD-R and DVD-RW) stores video and navigation data in a slightly different manner, a number of different and complimentary algorithms may be used, alone or in combination, to locate lost video data and to make the disc recoverable.

For example, the stream traversal algorithm may be applied to all disc types. Similarly, the use of recording flags may be applied to various disc types to indicate when a recording failure has occurred.

While the preferred embodiment and various alternative embodiments of the invention have been disclosed and described in detail herein, it may be apparent to those skilled in the art that various changes in form and detail may be made therein without departing from the spirit and scope thereof.

For example, while the present invention is disclosed as being used to make the DVD readable by an ordinary DVD player, the techniques of the present invention may also be used to salvage data from a damaged or partially recorded DVD or other type of storage media such that the data can be reconstructed (e.g., for forensic purposes). In such an embodiment, a new DVD or other media may be created, having all of the lost data from the original damaged or partially recorded media restored. Thus, for example, if a user has a damaged or partially recorded DVD, DVD-R or DVD-RW (or CD, CD-ROM, CD-R, CR-RW, or the like), the user may be able to insert the damaged media into the DVD recorder of the present invention. The DVD recorder may then salvage data on the disc and burn a new disc for the user. Alternately, such data may be salvaged and downloaded to a computer or other device for review or use.

It also should be emphasized that since many of the DVD recording techniques, particularly for the −VR standard, are similar to recoding techniques for hard disc drives (HDD), floppy disc drives (FDD), tapes drives, and other magnetic media, and other storage media, the techniques of the present invention may be suitably adapted to recover partially recorded or lost data from such devices.

Such data recovery techniques may be used to recover data on damaged media, but may also be used in a dynamic fashion to recover data in a manner transparent to the end user.

I claim:

1. A method of recording data on a recording media to allow for data recovery in the event the data is only partially recorded on the recording media, comprising:
   setting a flag on the recording media before recording to a first value indicating recording is in progress,
   recording the data on the recording media,
   setting the flag on the recording media after recording the data to the recording media to a second value indicating that recording is completed; and
   setting the flag to a third value after recording of the data to the recording media but before recording navigation data to the media describing the location of the data on the recording media;
   wherein if recording is interrupted, the presence of partially recorded data is detected by detecting the third value of the flag on the recording media, and if the data is fully recorded on the recording media, the presence of partially recorded navigation data is detected by detecting the second value of the flag on the recording media.

2. A method of recovering partially recorded recording data on a recording medium, comprising:
   detecting, on the recording medium, a pre-recorded recording flag and reading the recording flag value,
   determining if the recording data was fully recorded when the recording flag value is a first value,
   determining if the recording data was partially recorded when the recording flag is a second value, and
   determining if the recording data was fully recorded but navigation data was partially recorded when the recording flag is a third value.

3. The method of claim 2, further comprising:
   reconstructing, if at least the recording data was partially recorded, navigation data for the recorded data by traversing at least a portion of the partially recorded recording data to detect navigation packs embedded in the recorded data, the navigation packs containing at least pointer data indicating the location of a next navigation pack; and
   recording the navigation data to the recording medium such that the recorded data can be later read by a reading device for the recording medium.

4. The method of claim 3, wherein traversing the at least partially recorded recording data further comprises:
   sequentially traversing a plurality of Video Object Units (VOBUs) in at least a portion of the at least partially recorded recording data to locate a first navigation pack, the first navigation pack containing at least information as to the location of subsequent navigation packs,
   processing through a chain of navigation packs starting with the first navigation pack until no more valid navigation packs are found, and
   generating navigation data from the chain of navigation packs to indicate location of the recording data on the recording media.

5. The method of claim 4, further comprising:
   locating, on the recording media, state information for a last title recorded of the at least partially recorded recording data,
   constructing navigation data from at least the state information for the last title recorded of the at least partially recorded recording data,
   traversing any remaining portion of the at least partially recorded recording data to reconstruct navigation information for the remaining portion, and
   combining the state information for the last title recorded of the at least partially recorded recording data with the navigation information for the remaining portion to create navigation data for the at least partially recorded recording data.

6. The method of claim 4, further comprising:
   retrieving a backup copy of state information for recorded titles of the at least partially recorded recording information,
   combining the backup copy of the state information with navigation information from the stream traversal step to produce navigation data for the at least partially recorded recording data.

7. The method of claim 4, wherein the recording media comprises at least two tracks of data, a first track for storing navigation data, and a second track for storing recording data and state information about the recording data, further comprising:
   reconstructing state information data for the at least partially recorded recording data by reading state information for a least fully recorded title of the at least partially recorded recording data and traversing a remaining portion of the at least partially recorded recording data to retrieve embedded navigation information for the remaining portion of the at least partially recorded recording data, and finalizing the recording media by recording to the first track navigation data constructed from reconstructed state information from said reconstructing state information.

8. The method of claim 4, further comprising:
retrieving stored pre-stream information from selected unused locations inside navigation packs in the at least partially recorded recording data, the stored pre-stream information including a location of a last valid copy of state information for the at least partially recorded recording data.

9. The method of claim 8, wherein the stored pre-stream information comprises the last 471 bytes of a navigation pack in the at least partially recorded recording data.

10. An apparatus for recording data on recording media to allow for data recovery in the event the data is only partially recorded on the recording media, comprising:
means for setting a flag on the recording media before recording, to a first value indicating recording is in progress,
means for recording the data on the recording media,
means for setting the flag on the recording media after recording the data to the recording media, to a second value indicating that recording is completed; and
means for setting the flag to a third value after recording of the data to the recording media but before recording navigation data to the media describing the location of the data on the recording media;
wherein if the recording is interrupted, the presence of partially recorded data may be detected by detecting the third value of the flag on the recording media, and if the data is fully recorded on the recording media, the presence of partially recorded navigation data may be detected by detecting the second value of the flag on the recording media.

11. An apparatus for recovering partially recorded recording data on a recording medium comprising:
means for detecting, on the recording medium, a pre-recorded recording flag and reading the recording flag value,
means for determining if the recording data was fully recorded when the recording flag value is a first value,
means for determining if the recording data was partially recorded when the recording flag is a second value, and
means for determining if the recording data was fully recorded but navigation data was partially recorded when the recording flag is a third value.

12. The apparatus of claim 11, further comprising:
means for reconstructing, if at least the recording data was partially recorded, navigation data for the recorded data by traversing at least a portion of the partially recorded recording data to detect navigation packs embedded in the recorded data, the navigation packs containing at least pointer data indicating the location of a next navigation pack; and
means for recording the navigation data to the recording medium such that the recorded data can be later read by a reading device for the recording medium.

13. The apparatus of claim 12, wherein said means for traversing the at least partially recorded recording data further comprises:
means for sequentially traversing a plurality of Video Object Units (VOBUs) in at least a portion of the at least partially recorded recording data to locate a first navigation pack, the navigation pack containing at least information as to the location of subsequent navigation packs,
means for processing through a chain of navigation packs starting with the first navigation pack, until no more valid navigation packs are found, and
means for generating navigation data from the chain of navigation packs to indicate location of the recording data on the recording media.

14. The apparatus of claim 13, further comprising:
means for locating on the recording media, state information for a last title recorded of the at least partially recorded recording data,
means for constructing navigation data from at least the state information for the last title recorded of the at least partially recorded recording data,
means for traversing any remaining portion of the at least partially recorded recording data to reconstruct navigation information for the remaining portion, and
means for combining the state information for the last title recorded of the at least partially recorded recording data with the navigation information for the remaining portion to create navigation data for the at least partially recorded recording data.

15. The apparatus of claim 13, further comprising:
means for retrieving a backup copy of state information for recorded titles of the at least partially recorded recording information,
means for combining the backup copy of the state information with navigation information from the stream traversal to produce navigation data for the at least partially recorded recording data.

16. The apparatus of claim 13, wherein the recording media comprises at least two tracks of data, a first track for storing navigation data, and a second track for storing recording data and state information about the recording data, the apparatus further comprising:
means for reconstructing state information data for the at least partially recorded recording data by reading state information for a least fully recorded title of the at least partially recorded recording data and traversing a remaining portion of the at least partially recorded recording data to retrieve embedded navigation information for the remaining portion of the at least partially recorded recording data, and
means for finalizing the recording media by recording to the first track navigation data constructed from reconstructed state information from said step of reconstructing state information.

17. The apparatus of claim 13, further comprising:
means for retrieving stored pre-stream information from selected unused locations inside navigation packs in the at least partially recorded recording data, the stored pre-stream information including a location of a last valid copy of state information for the at least partially recorded recording data.

18. The apparatus of claim 13, wherein the stored pre-stream information comprises the last 471 bytes of a navigation pack in the at least partially recorded recording data.

* * * * *